United States Patent [19]
Knudson

[11] 3,857,225
[45] Dec. 31, 1974

[54] BEAN THINNING AND CUTTING DEVICE

[76] Inventor: Glenn C. Knudson, Larimore, N. Dak. 58251

[22] Filed: Nov. 30, 1972

[21] Appl. No.: 310,906

Related U.S. Application Data

[63] Continuation-in-part of Ser. No. 233,218, March 9, 1972, abandoned.

[52] U.S. Cl. .................... 56/13.6, 56/10.4, 56/11.9, 56/15.9, 56/63, 56/503
[51] Int. Cl. ............................................ A01d 55/26
[58] Field of Search .............. 56/6, 10.4, 11.9, 13.6, 56/15.9, 63, 121.43, 255, 295, 503, DIG. 15

[56] References Cited
UNITED STATES PATENTS

| | | | |
|---|---|---|---|
| 3,017,732 | 1/1962 | Keyes | 56/13.6 X |
| 3,391,522 | 7/1968 | Zweegers | 56/6 |
| 3,543,489 | 12/1970 | Maier et al. | 56/10.4 |
| 3,545,184 | 12/1970 | Liepold et al. | 56/10.4 X |
| 3,665,685 | 5/1972 | Allard | 56/10.4 |

*Primary Examiner*—Russell R. Kinsey
*Attorney, Agent, or Firm*—Robert E. Kleve

[57] ABSTRACT

The invention comprises a bean thinning or cutting device adapted to be attached to the front of a tractor and pushed through a bean field in front of a tractor for cutting and trimming the bean plant. The bean cutting device has a frame with a pair of wheels mounted to the opposing edges of the frame. Four cutting disc-like cutting blades are mounted to the frame for cutting the bean plants. The cutting blades are pivotally mounted to the frame to pivot rearward to clear rocks in the field. The blades each have enlarged drum and discs at the top of the drums to prevent the cut plants from wrapping around. The disc blades are individually powered by hydraulic motors which motors are controlled independantly of the tractor speed controls.

1 Claim, 5 Drawing Figures

PATENTED DEC 31 1974 3,857,225

BEAN THINNING AND CUTTING DEVICE

This application is a continuation in part of my earlier co-pending patent application, Ser. No. 233,218, filed Mar. 9, 1972 and now abandoned.

This invention relates to agricultural equipment, more particularly the invention relates to bean equipment.

It is an object of the invention to provide a novel bean plant thinning device for attachment to the front of a tractor for easily and rapidly thinning bean plants growing in the field.

It is another object of the invention to provide a novel bean thinning device which has an enlarged drum with a projecting disc at the top of the drum and a projecting disc-like cutting blade at the bottom of the drum which rotates with the rotary disc blade projecting from the drum to cut the plants, and with the enlarged drum portion and upper disc acting to minimize the amount of wrap around of the bean plant with the drum and cutting blade.

It is a further object of the invention to provide a novel beam plant thinning device which can be easily operated in the field for thinning bean plants and which has an operation which minimizes the amount of clogging or entanglement of the bean plants with the thinning device.

Further objects and advantages of the invention will become apparent as the description proceeds and when taken in conjunction with the accompanying drawings wherein.

Briefly stated, the invention comprises a bean plant thinning device for attachment to the front of a tractor and having a plurality of rotary cutting blade devices, each blade device has an enlarged drum with a disc blade projecting from the bottom of the drum, and with a disc projecting from the top of the cutting blade, a sleeve rotatably supporting the cutting devices, and means pivotally connecting the sleeves to a frame whereby the disc blades devices including their disc blades, enlarged drums and upper disc and hydraulic motor may pivot rearwardly to clear rocks, and with the rotary disc blade acting to cut bean plants in the field to thin the bean plants, and with the enlarged drums and upper discs acting to minimize the wrap around entanglement of the bean plants with the cutting devices.

Figure 1:
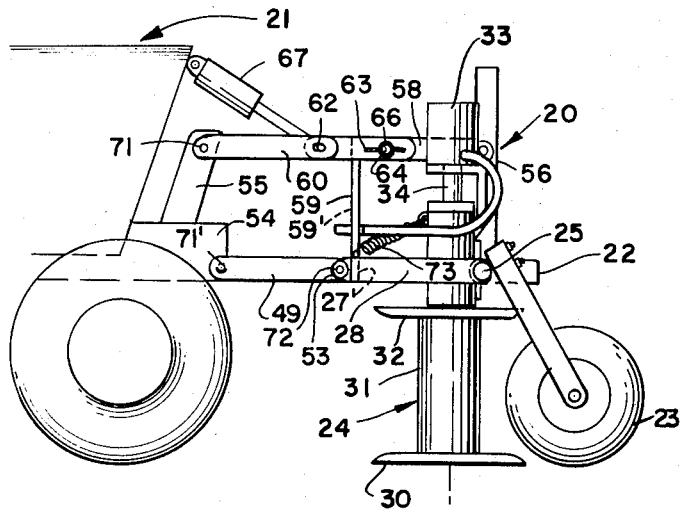
FIG. 1 is a side elevational view of the bean plant thinning invention shown attached to the front of a tractor.
Figure 2:
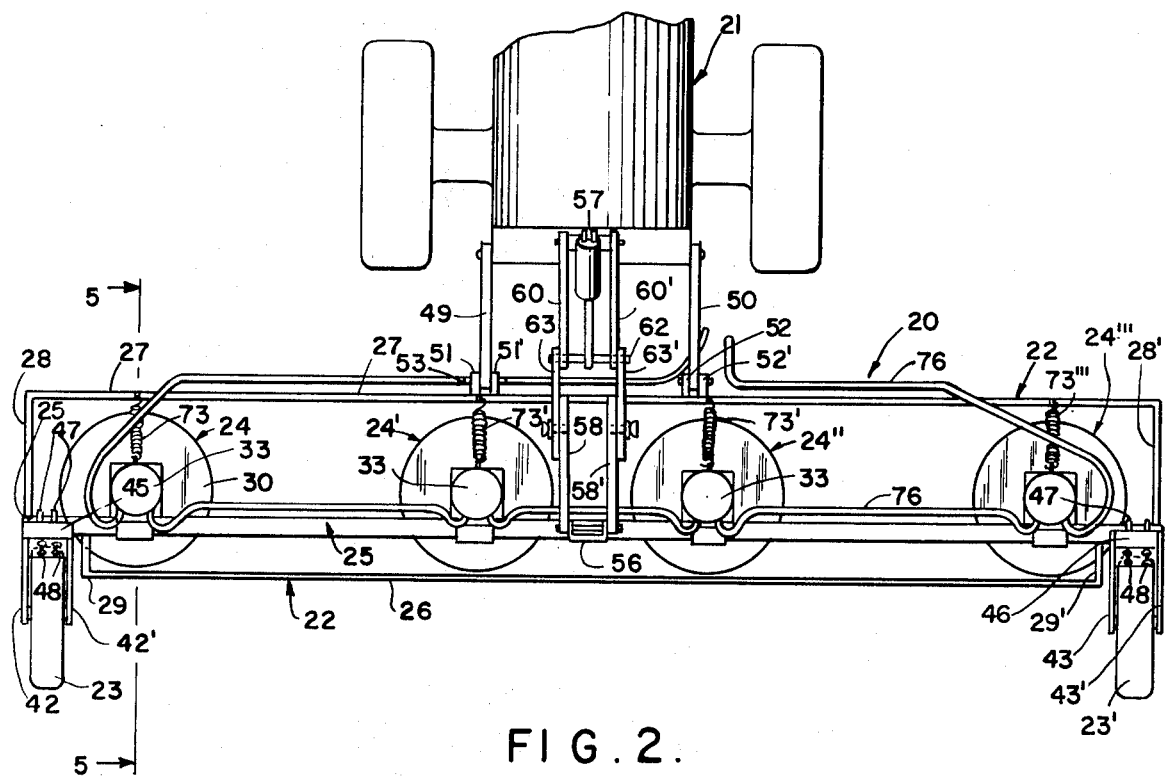
FIG. 2 is an enlarged top plan view of the bean plant thinning invention.
Figure 3:
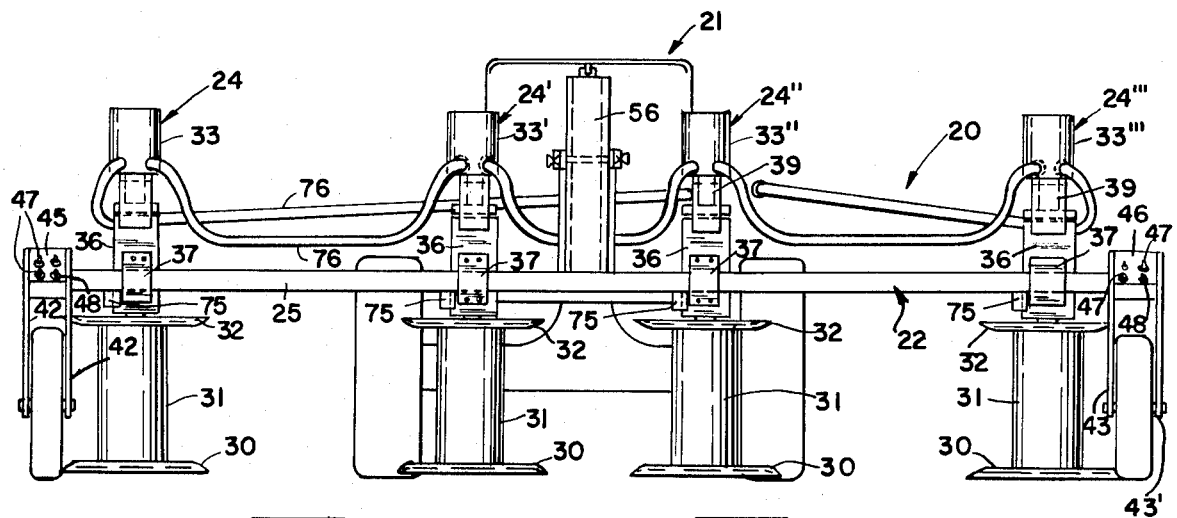
FIG. 3 is a rear side elevational view of the bean plant thinning invention.

Referring more particularly to the drawings in FIGS. 1 and 2 and 3, the bean vine cutting implement 20 is illustrated mounted in front of a tractor 21.

The bean vine cutting implement 20 has a rectangular frame 22 with wheels 23 and 23' mounted on the outer opposing ends 22' and 22" of the frame and four disc blade members 24, 24', 24", and 24'" mounted to the frame.

The rectangular frame 22 is formed of an elongated cylindrical center rod 25, an elongated front beam 26 and an elongated rear beam 27 in parallelism to one another. The rear beam 27 is fixed to the center beam 28 by a pair of side beams 28 and 28' fixed therebetween. The front beam 26 is fixed to the center beam or rod 25 by a pair of side beams 29 and 29' fixed therebetween.

The disc-like blade members 24, 24', 24", and 24'" are identical in construction to one another. Each blade member 24–24'" has a disc-like cutting blade 30 at its lower end for cutting the bean vines. An enlarged drum 31 is fixed on top of the cutting blade in coaxial relation and a projecting disc 32 is fixed on top of the enlarged drum 31 and projects radially outward therefrom. As can be seen from several figures of the drawings, the radius of the drum 31 is at least approximately one third the radius of the blade 30 and is also larger than the shaft 34. At the top of each blade member 24–24'" is a hydraulic motor 33. The hydraulic motor 33 has an output drive shaft 34 which extends downward from the motor and is fixed at its lower end 34' coaxially to the disc 32, so that the output shaft 34 and disc 32, drum 31, and blade 30 are fixed together in each blade member 24–24'".

Each blade member 24–24'" has a pair of collar bearings 35 and 35' which are rotatably mounted about the shaft 34 and provide a bearing support for the shaft 34. The collar bearings 35 and 34' are fixed in side a rectangular sleeve 36, and the sleeves 36 are each pivotally mounted on the center rod 25 by a U-shaped strap 37 which has its apex 37' surrounding the rod and rotatably mounted thereon, and with the legs 38 and 38' of the U-strap being fixed to their respective sleeves 36, so that the sleeves 36 may rotate about the cylindrical rods 25.

An L-shaped flange 39 is fixed to the top of each sleeve 36, with the casing 40 of each respective hydraulic motor 33 being fixed to the one leg 39' of the flange. The output shaft 34 passes freely through a center bore 41 in the one leg 39' of the L-flange so that the shaft 34 may rotate relative to the L-shaped flange 39. The shaft 34 has an enlarged collar 34" which rotates upon the upper edge 36' of the sleeve. The enlarged collar 34" and the disc 32 prevents axial movement of the shaft 34 relative to the sleeve and L-flange while enabling the shaft 34, disc 32, drum 31, and blade 30 to rotate relative to the sleeve when powered by the hydraulic motor 33.

The wheels 23 and 23' are rotatably mounted to the lower ends of legs 42 and 42' and 43 and 43', respectively, by pins 44. The upper ends of the legs 42 and 42' and 43 and 43' are adjustably fixed to the outer ends of the center rod 25, a plate 45 is fixed between legs 42 and 42' and a plate 46 is fixed between legs 43 and 43' and U-bolts 47 pass around the center rod 25 and through bores in the plates 45 and 46, and nuts 48 are tightened onto the outer ends of the legs of the U-bolts and against the plates to lock the upper ends of the legs 42 and 42' and 43 and 43' to the center rod 25. The angle of the legs 42 and 42' and 43 and 43' may be adjusted by loosening the nuts 48 and adjusting the legs relative to the center rod and retightening the nuts 48.

The frame 22 is pivotally attached to the front of the tractor by a pair of beams 49 and 50 which are pivoted to the opposing sides of the tractor and project forward. A dual pair of lugs 51 and 51' and 52 and 52' are fixed to the rear beam 27 and project rearward and pins 53 pivotally connect the lugs 51 and 51' and 52 and 52' to the forward ends of the beams 49 and 50.

A plate 54 is fixed between the beams 49 and 50 at the front of the tractor 21 and an upright arm 55 is fixed to the plate 54 and projects upward. The frame 22 has a vertical U-shaped channel member 56 fixed to the center rod 25 and projects vertically upward. A lug 57 is fixed centrally to the front of the tractor 21.

A pair of arms 58 and 58' have their one ends fixed to the upright channel member 56 and project rearward. A pair of vertical arms 59 and 59' are fixed to the rearward ends of the arms 58 and 58' and project downward and are fixed at their lower ends to the rear beam 27.

A pair of elongated beams 60 and 60' have their one ends pivotally mounted to the upright arm 55 and project forward. A second pair of beams 61 and 61' have their rearward ends pivotally mounted to the forward ends of beams 60 and 60' by a pin 62 which pivotally connects the plates together. The forward ends of the beams 61 and 61' have slots 63 and beams 58 and 58' have bolts 64 fixed to their rearward ends which project through slots 63 and washer and a nut member 66 is threaded onto the outer ends of the bolts 64 and tighten the beams 58 and 58' and 61 and 61' together, respectively, in overlapping adjustable relation.

A hydraulic cylinder 67 has a cylinder portion and a piston rod which piston rod is pivotally mounted to the pin 62 and with the cylinder portion pivotally mounted to the leg 57 on the tractor.

To raise the disc blades 24–24''', the entire frame 22 and wheels 23 and 23' off the ground to an inoperative position for transporting the trimmer invention 20, the operator will retract the piston rod into the cylinder of hydraulic cylinder 67 from its position shown in FIG. 1, which pivots the link arms 60 and 60', 61 and 61' and 58 and 58' upward about pivot points 71 and 71' which raises the frame 22, blades 24–24''' and wheels 23 and 23' upward in parallelism so that the shaft 34 remains vertically upright and perpendicular to the ground.

If it is desired to simply adjust the angle of the blade relative to the ground, the operator will loosen the bolts 64, and slide the beam 58 and 58' and 61 and 61', respective, toward or away from one another which pivots the entire frame 22 and blades 24–24''' about the pivot points 72 to change the angle of the blades 24–24''' relative to the ground and then retighten the bolts 64.

If it is desired to simply adjust the height of the blades relative to the ground, the piston will be retracted or telescoped outward, then the wheels 23 and 23' will be adjusted relative to the frame by loosening the nut 48 and pivoting the arms 42 and 42' and 43 and 43' about the shaft 28 and relative to the frame and to adjust the wheel relative to the frame 22 so that they engage the ground.

The bean vine trimming and cutting implement 20 operates as follows: The trimmer implement 20 will be pushed by the tractor 21 from left to right when viewed from FIG. 1, through a bean field for trimming and cutting bean vines.

The four hydraulic motors 33, 33', 33'', and 33''' will be activated by the hydraulic variable pump on the tractor and the activation of the hydraulic motors rotates the output shaft 34 which rotates the discs 32, drums 31, and blades 30 counterclockwise, when viewed from FIG. 2 as the trimmer invention is pushed from left to right through the bean field, when viewed from FIG. 1, the rotating blades 30 being spaced at or a short distance below the ground of approximately an inch will trim and cut the bean vines, or bean stalks, or bean plants on the ground in their path.

The rotating output shaft 34 will be rotated at a speed controlled independantly by the variable speed pump, which speed will be independant of the tractor speed controls.

The shafts 34 will be rotated at a speed which is fast enough to cut the bean vines along the front edge of the disc blades 30 and as the blades 30 rotate around they will act to carry much of the cut bean vine around and allow them to drop off the back blades 30.

It is desirable to have the speed of the blade regulated independently of the tractor speed control, so that the blade speed can be closely regulated since the blades 30 are allowed to rotate too fast, the cut bean vines will have more of a tendency to wrap around the drums 31.

The drums 31 are enlarged to minimize wrapping around of the cut bean vines onto the drum. The upper discs 32 project outward to prevent the cut bean vines from wrapping around the shaft 34, which wrapping around of the cut bean vines will otherwise tend to clog or interfer with operation of the trimmer invention.

The subject matter he has added to the application by this invention-in-part application is as follows:

The four blade assemblies 24, 24', 24'', and 24''' each pivot individually about the center rod 25 of the frame. Four coil springs 73, 73', 73'', and 73''' act to urge the blade assemblies into their position shown in FIGS. 1–5. The four coil springs 73, 73', 73'', and 73''' each has its rear end attached to the rear frame member 27 and each has its front ends attached to eyelets 74 fixed to the rear of the sleeve 36 of the respective blade assemblies 24, 24', 24'', and 24'''.

The springs 73–73''' urge the blade assemblies 24, 24', 24'', and 24''' in a counter clockwise direction when viewed in FIGS. 1–5 and are under compression when the blade assemblies are in the upright position and urge the front of the sleeves 36 against stop members 75, which stop member 75 is a plate which is fixed to the rod 25 and projects downward and the urging of the block assemblies against the stop members 75, maintains the blade assemblies in their upright position.

Figures 4, 5:
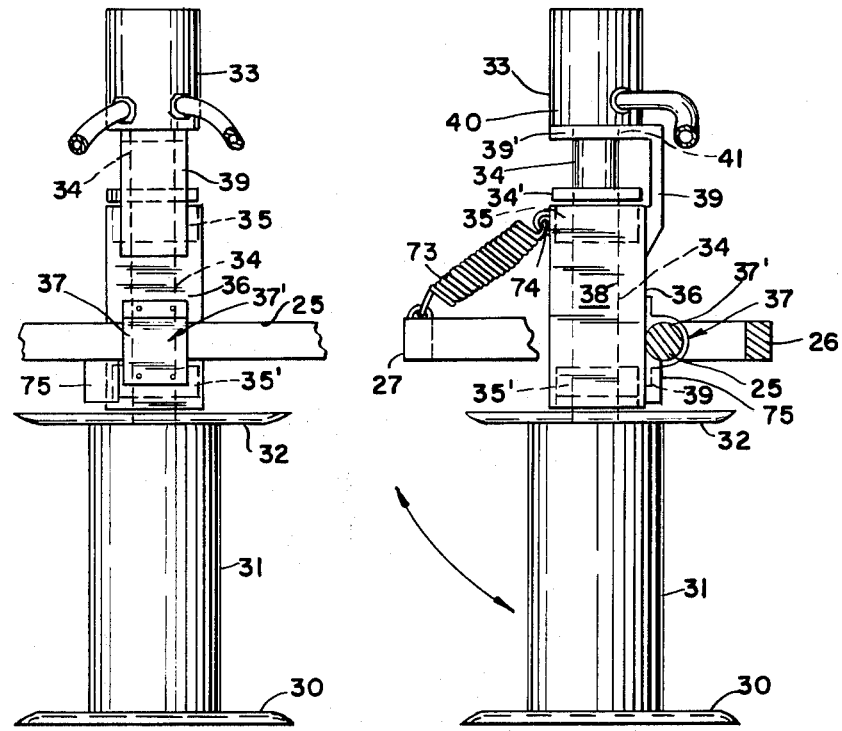
FIG. 4 is an enlarged fragmentary front elevational view of one of the rotary bean plant cutting blades.
FIG. 5 is a cross-sectional view of one of the rotary bean plant cutting blades taken along line 5—5 of FIG. 2.

While the stop members 75 prevent any pivoting of the blade assemblies in a counterclockwise direction, further than shown in FIGS. 1–5, the blade assemblies free to pivot clockwise, from their positions shown in FIGS. 1–5, relative to the rod 25 and the frame 22, in the event any one of the blade assemblies strikes a rock when the device is moving from left to right when viewed from FIGS. 1 & 5.

The pivoting of any one of the blade assemblies clockwise from its position shown in FIG. 5, causes its respective spring 73–73'' to expand. Consequently, once any one of the blades has pivoted clockwise upon engaging a rock and has cleared the rock its respective coil spring having expanded will urge the blade assembly back in a countclockwise direction until it is stopped by its sleeve 36 abutting the stop member 75, thus returning the blade assembly to its upright position for cutting once it has cleared the rock.

The hydraulic motor 33, 33', 33'', and 33''' are hydraulically connected to the variable speed pump on the tractor by flexible rubber hose connections 76 with the pump pumping hydraulic fluid to the hydraulic motor along hose lines 76 to activate and drive the hydraulic motors.

The hydraulic motors 33, 33', 33'', and 33''' are hydraulically connected to the variable speed hydraulic pump on the tractor by flexible rubber hose connections 76, which connect to the pump to the motors, so that the hydraulic pump can pump hydraulic fluid along the hose lines 76 to actuate and drive the hydraulic motors. The hose connections 76 being of a flexible rubber or resilient plastic construction enabling the blades to pivot about the rod 25, individually, as previously described.

Thus, it will be seen that a novel bean vine cutting and trimming implement has been provided which will efficiently and rapidly cut and trim bean vines, and operation can be closely controlled and constructed so as to minimize the wrapping around and clogging of the bean vines on the machine as it performs its cutting operation.

It will be obvious that various changes and departures may be made to the invention without departing from the spirit thereof and accordingly it is not intended that the invention be limited to that specificially described in the specification or as illustrated in the drawing, but only as set forth in the appended claims wherein:

I claim:

1. A bean cutting device adapted to be mounted to a tractor, said device comprising a frame, wheels mounted to the outer opposing ends of the frame for supporting the frame on the tractor, a plurality of sets of cutter blade mechanisms mounted to said frame, each cutter blade mechanism having a blade, a circular drum, a shaft, a hydraulic motor, and a bracket, said blades being flat disc-like with a circular outer circumferential cutting edge, said blade being mounted to the lower end of the circular drum with the outer circular edge of the blade projecting outward beyond the outer circumference of the drum, said shaft being of reduced size in relation to said drum and fixed coaxially to the upper end of said drum and projecting upward therefrom, said shaft being rotatably mounted to said bracket, so that said shaft can rotate about its center axis to rotate said drum and blade, said hydraulic motor being fixed to said bracket and having an output drive to drive said shaft to rotate said shaft to thereby individually power the blade in each mechanism said drum having a radius of at least approximately one third the radius of said blade and larger than said shaft, said brackets of each set of blade mechanism being pivotally mounted about a horizontal axis to said frame to pivot said blade, drive shaft and hydraulic motor about said horizontal axis and to individually pivot said blade and drum toward the rear of said tractor, stop means to prevent said blades in said sets from pivoting forward, and spring means to urge said blade sets forward against said stop means.

* * * * *